(12) United States Patent
Page

(10) Patent No.: US 7,363,291 B1
(45) Date of Patent: Apr. 22, 2008

(54) METHODS AND APPARATUS FOR INCREASING EFFICIENCY OF ELECTRONIC DOCUMENT DELIVERY TO USERS

(75) Inventor: Lawrence E. Page, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 416 days.

(21) Appl. No.: 10/113,796

(22) Filed: Mar. 29, 2002

(51) Int. Cl.
*G06F 17/30* (2006.01)
*G06F 17/00* (2006.01)

(52) U.S. Cl. .......................... 707/3; 707/10; 707/104.1

(58) Field of Classification Search ............... 707/3, 707/10, 100, 101, 200, 203, 104.1; 382/100, 382/249; 713/176
See application file for complete search history.

(56) References Cited

U.S. PATENT DOCUMENTS

| | | | |
|---|---|---|---|
| 4,953,106 A | 8/1990 | Gansner et al. | 345/440 |
| 5,450,535 A | 9/1995 | North | 395/140 |
| 5,748,954 A | 5/1998 | Mauldin | 395/610 |
| 5,752,241 A | 5/1998 | Cohen | 707/3 |
| 5,832,494 A | 11/1998 | Egger et al. | 707/102 |
| 5,848,407 A | 12/1998 | Ishikawa et al. | 707/2 |
| 6,014,678 A | 1/2000 | Inoue et al. | 707/501 |
| 6,085,193 A * | 7/2000 | Malkin et al. | 707/10 |
| 6,088,707 A * | 7/2000 | Bates et al. | 715/501.1 |
| 6,098,064 A * | 8/2000 | Pirolli et al. | 707/2 |
| 6,230,168 B1 * | 5/2001 | Unger et al. | 715/501.1 |
| 6,272,534 B1 * | 8/2001 | Guha | 709/216 |
| 6,282,542 B1 * | 8/2001 | Carneal et al. | 707/10 |
| 6,285,999 B1 | 9/2001 | Page | 707/5 |
| 6,744,452 B1 * | 6/2004 | McBrearty et al. | 715/853 |
| 6,853,391 B2 * | 2/2005 | Bates et al. | 715/854 |
| 2002/0143984 A1 * | 10/2002 | Hudson et al. | 709/238 |
| 2002/0184340 A1 * | 12/2002 | Srivastava et al. | 709/219 |
| 2004/0049598 A1 * | 3/2004 | Tucker et al. | 709/246 |

OTHER PUBLICATIONS

Craswell et al, "Effective Site Finding using Link Anchor Information", ACM 2001, pp. 250-257.*
Tetsuo Sakaguchi et al, "A Browsing Tool for Multi-lingual Docuents for Users without Multi-lingual Fonts", ACM 1996, pp. 63-71.*
Arocenag.O., et al., "Applications of a Web Query Language," *Computer Networks and ISDN Systems*, vol. 29, No. 8-13, 1997, pp. 1305-1316.
Carriere, J., "WebQuery: Searching and Visualizing the Web Through Connectivity," *Proceedings of the 6th Int'l World Wide Web Conf.*, 1997, pp. 1-14.
Frisse, M.E., "Searching for Information in a Hypertext Medical Handbook," *Communications of the ACM*, vol. 31, No. 7, 1988, pp. 880-886.

(Continued)

*Primary Examiner*—Uyen Le

(57) ABSTRACT

A computer-implemented method serves electronic document information in response to a user query identifying a target electronic document. The user query prompts a library search of library-stored electronic documents to determine whether the target electronic document corresponds to a library-stored electronic document. When the target electronic document corresponds to a library-stored electronic document, the library-stored electronic document is presented for review by the user. Also presented is information associated with the relationship between the library-stored electronic document and the target electronic document. In some embodiments, if the target electronic document does not correspond to the library-stored electronic documents, the method includes providing-link information for user access to the target web page.

26 Claims, 1 Drawing Sheet

OTHER PUBLICATIONS

Kleinberg, J.K., "Authoritative Sources in a Hyperlinked Environment," *Proceedings of the 9th Annual ACM-SLAM Symposium on Discrete Algorithms*, 1998, pp. 668-677.

Luotonen, A., et al., "World-Wide Web Proxies," *Computer Networks and ISDN Systems*, vol. 27, No. 2, Nov. 1994, pp. 147-154.

McBryan, O.A., "GENVL and WWWW: Tools for Taming the Web," *Proceedings of the 1st Int'l World Wide Web Conf.*, 1994, pp. 1-13.

Wang et al., "Prefetching in World Wide Web," IEEE, 1996, pp. 28-32.

Carriere, S.J. et al.., "Web Query: Searching and Visualizing the Web Through Connectivity," *Computer Networks and ISDN Systems*, vol. 29, 1997, pp. 1257-1267.

Ramer et al., "Similarilty, Probability and Database Organization: Extended Abstract," 1996, pp. 272-276.

Boyle, C., "To Link or Not to Link: An Empirical Comparision of Hypertext Linking Strategies," ACM, 1992, pp. 221-231.

Katz, L., "A New Status Index Derived from Sociometric Analysis," *Psychometricka*, vol. 18, 1953, pp. 39-43.

Hubbell, C.H., "An Input-Output Approach to Clique Identification Sociometry," 1965, pp. 377-399.

Mizruchi et al., "Techniques for Disaggregating Centrality Scores in Social Networks," *Sociological Methodology*, 1996, pp. 26-48.

Garfield, E., "Citation Analysis as a Tool in Journal Evaluation," *Science*, vol. 178, 1972, pp. 471-479.

Pinski et al., "Citation Influence for Journal Aggregates of Scientific Publications: Theory, with Application to the Literature of Physics," *Inf. Proc. and Management*, vol. 12, 1976, pp. 297-312.

Geller, N., "On the Citation Influence methodology of Pinski and Narin," *Inf. Proc. and Management*, vol. 14, 1978, pp. 93-95.

Doreian, P., "Measuring the Relative Standing of Disciplinary Journals," *Inf. Proc. and Management*, vol. 24, 1988, pp. 45-56.

Doreian, P., "A Measure of Standing for Citation Networks Within a Wider Environment," *Inf. Proc. and Management*, vol. 30, 1994, pp. 21-31.

Botafogo et al., "Structural Analysis of Hypertext: Identifying Hierarchies and Useful Metrics," *ACM Trans. Inc. Systems*, vol. 10, 1992, pp. 142-180.

Marchiori, M., "The Quest for Correct Information on the Web: Hyper Search Engines," *Computer Networks and ISDN Systems*, vol. 29, No. 8-13, 1997, 1225-1235.

Carriere et al., "WebQuery: Searching and Visualizing the Web Through Connectivity," *Proceedings of the 6th Int'l World Wide Web Conf.*, 1997, pp. 1-14.

Arocena et al., "Applications of a Web Query Language," *Computer Networks and ISDN Systems*, vol. 29, No. 8-13, 1997, pp. 1305-1316.

Kleinberg, J.K., "Authoritative Sources in a Hyperlinked Environment," *Proceedings of the 9th Annual ACM-SLAM Symposium on Discrete Algorithms*, 1998, pp. 668-677.

Henzinger et al., "Measuring Index Quality Using Random Walks on the Web," *Proceedings of the 8th Int'l World Wide Web Conf.*, 1999, pp. 213-225.

* cited by examiner

METHODS AND APPARATUS FOR INCREASING EFFICIENCY OF ELECTRONIC DOCUMENT DELIVERY TO USERS

CROSS-REFERENCE TO RELATED APPLICATIONS

This application relates to U.S. patent application Ser. No. 09/899,068, filed Jul. 6, 2001, now U.S. Pat. No. 6,799,176, which is in turn a continuation of U.S. patent application Ser. No. 09/004,827, entitled "Method for Node Ranking in a Linked Database," filed on Jan. 9, 1998, now U.S. Pat. No. 6,285,999, which claims priority to U.S. Provisional Patent Application Ser. No. 60/035,205 filed Jan. 10, 1997, priority to which is claimed under 35 U.S.C. § 120 for any common subject matter.

FIELD OF THE INVENTION

The present invention generally relates to hyperlinked documents and, more particularly, to techniques for accelerating access to hyperlinked documents through a data network.

BACKGROUND OF THE INVENTION

The World Wide Web (or "Web") contains a vast amount of information in the form of hyperlinked documents (e.g., web pages) loosely-organized and accessed through a data communication network (or "Internet"). Diverse computer networks use a communication protocol to coordinate the exchange of information. For example, the Internet uses a protocol known as Transmission Control Protocol/Internet Protocol (TCP/IP). The Internet, typically accessed through an electronic link from a computer which has an identifiable Internet address and a TCP/IP communications capability, uses a client-server model of computer hierarchy. The server provides information commonly presented in the form of viewable web pages, and the client being a computer retrieving the information (i.e., selecting and displaying desired web pages). Various information exchanges on the Internet are available, including File Transfer Protocol (FTP), which refers to moving files from one place to another on the Internet. The files may contain electronic documents, images, sounds, video, etc.

One of the reasons for the virtually explosive growth in the number of hyperlinked documents on the Web is that just about anyone can upload hyperlinked documents, which can include links to other hyperlinked documents. The unstructured nature and sheer volume of web pages available via the Internet makes it difficult to navigate efficiently through related information while avoiding unrelated information.

One conventional way to navigate a computer network (e.g., the internet) is from node to node (e.g., web page to web page), through a directory tree structure. A node address for a node connected to the present node is provided to progress along a path toward a desired destination. Nodes may be physical such as computers, or logical such as one of many web pages or Internet sites within a computer. In contrast, through hypertext links, one can "jump" from one place of information on the internet to another, hypertext links essentially being "short-cuts" directly to a desired information destination. The destination need not be immediately connected to the present computer or web page, and may be physically located half-way around the world form the physical location of the present computer or web page.

A user typically begins a search using a search engine. A search engine attempts to return relevant information in response to a request from a user. This request usually comes in the form of a query (e.g., a set of words that are related to a desired topic). Search engines typically return a number of links to web pages, with a brief description of those pages. Because the vast number of pages on the Web, ensuring that the returned pages are relevant to the topic the user had in mind is a central problem in web searching.

Latency is currently a significant problem for Internet users. Web pages can take several seconds to load because of servers slowed from overloading, congested data network paths, data packet routing delays and "DNS" look-up issues. This problem is particularly significant for the vast majority of home-based users, who connect to the Internet via a limited bandwidth modem over a telephony network. This problem also affects high-bandwidth users, where the network and server latency can be a bigger bottleneck than the network bandwidth.

As the size of the Web continues to increase, it becomes increasingly more desirable to have innovative techniques for efficiently navigating, downloading and viewing hyperlinked documents.

SUMMARY OF THE INVENTION

The present invention is directed to an approach that maintains and efficiently presents electronic documents in response to a web-page searches, such as web-page queries by Internet users. The present invention is exemplified in a number of implementations and applications, some of which are summarized below.

According to one example embodiment, the present invention is directed to a computer-implemented method of serving electronic document information in response to a user query identifying a target electronic document. The method includes responding to the user query by searching a library of library-stored electronic documents to determine whether the target electronic document corresponds to a library-stored electronic document. In response to the target electronic document corresponding to the library-stored electronic document, the library-stored electronic document are presented for review by the user, and with the library-stored electronic document, presented is information associated with the relationship between the library-stored electronic document and the target electronic document.

According to a more particular aspect of the present invention, the above-characterized method also addresses the situation in which the target electronic document does not correspond to the library-stored electronic documents. In this instance, the method includes providing link information for user access to the target web page.

Other example embodiments of the present invention are directed to a computer-operated arrangements in which programmed tasks are adapted to execute various actions relating to those addressed in connection with the above-characterized computer-implemented method of serving electronic document information in response to a user query identifying a target electronic document.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
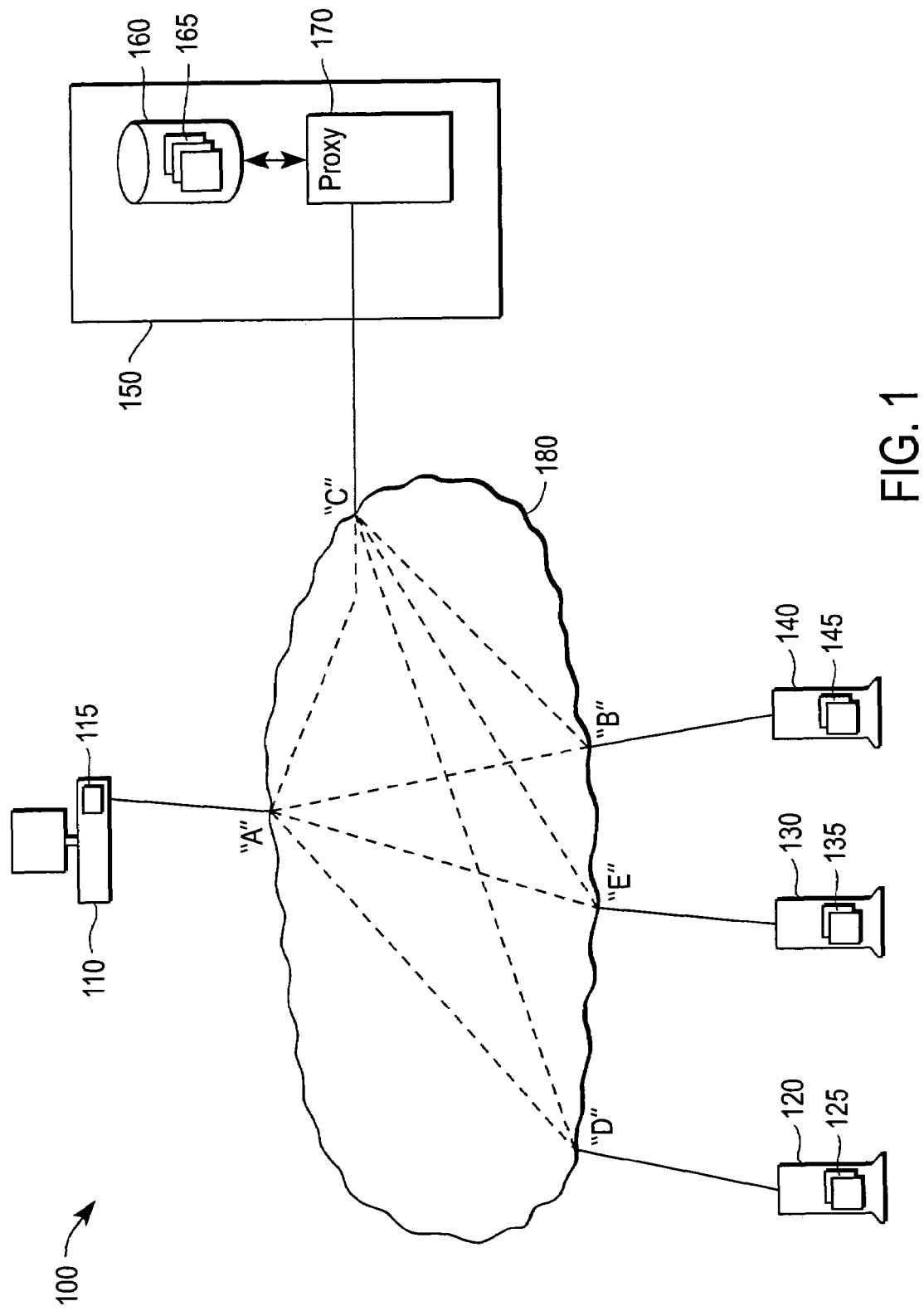
FIG. 1 illustrates a system block diagram of a data network arrangement, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to various types of data-communication systems, including the Internet and various intranet-type data networks. The present invention has been found to be particularly suited for accelerating web page delivery through the Internet, including searching hyperlinked documents via an Internet protocol (IP) network. While the present invention is not necessarily limited to such data-communication systems, various aspects of the invention may be appreciated through a discussion of various examples using this context.

FIG. 1 illustrates a system block diagram of a data network arrangement 100, according to an example embodiment of the present invention. Data network arrangement 100 includes at least one user computer 110, a plurality of web page servers 120, 130, and 140, and a proxy server 170 coupled to a data network 180, the Internet for example. Web page server 120 hosts web pages 125, web page server 130 hosts web pages 135, and web page server 140 hosts web pages 145. Web pages 125, 135, and 145 include hyperlinked and/or static documents respectively. Hereinafter, a web page requested by a user 110 (e.g., web page 125) may be referred to as a "target web page", and the web page server that hosts the target web page (e.g., web page server 120) may be referred to as a "target server." Hyperlinked documents are considered to encompass static and non-static portions. Other devices may also be included in, or coupled to, data network arrangement 100. Proxy server 170 is a part of a larger server 150, or optionally, is a stand-alone device. Proxy server 170 can be implemented as a server farm in a centralized location, or alternatively, in a distributed fashion. A memory cache 160 is part of or coupled to proxy server 170.

User 110 interfaces and navigates Internet 180 through a web browser application (not shown). Conventionally, user 110 retrieves information on web pages 145 by communicating "directly" with web page server 140 through Internet 180. Communications between user 110 and web page server 140 include available Internet paths. In various applications, these available Internet paths can include intervening computer connections; in this example, however, the connection is represented as being "direct" from point "A" to point "B" through Internet 180 in FIG. 1, with no illustrated intermediary connections. The location of the server 140 depends on the application; server 140 is in the same room as user 110 in one application and, in another application, across the world geographically. Operationally, user 110 inputs a fetch request for web page 145$s$ to server 140, with server 140 transmitting the requested information of web page 145$s$ digitally through data network 180 back to user 110. The time for user 110 to receive web page 145$s$ is dependent on many factors including, for example, the availability and speed of server 140 to fulfill the query, current data congestion of the data network 180, and the bandwidth of the connections between the data network 180 and the server 140, and the data network 180 and user 110.

In connection with the above system block diagram, one particular example implementation of the present invention involves a client proxy software application 115 being installed in each user computer 110. The proxy client 115 is distributed to users on digital media or downloaded over the data network, and installed. In an alternative embodiment of this type, the proxy client 115 is distributed integrally to a web browser application, for example, being invoked from a toolbar application. Proxy client 115 communicates with the proxy server 170 using a standard communications port (e.g., port 80) with communications enabled through firewalls.

At some point in time (e.g. arbitrarily- or operator-defined), proxy server 170 retrieves a copy of web pages 125, 135, and/or 145 from servers 120, 130, and/or 140. Proxy server 170 stores the retrieved web pages as web page copies 165 in a high-speed memory cache 160 according to a relative addressing scheme whereby correlation to the web page's original web-based addressing is preserved.

When user 110 requests a target web page (e.g., web page 125) such as by specifying the target web page's uniform resource locator (URL), proxy client 115 redirects user 110's information request instead to proxy server 170. Proxy server 170 determines whether memory cache 160 contains a web page copy 165 corresponding to the requested URL.

In this example embodiment, if memory cache 160 does not contain a web page copy 165 corresponding to the requested URL, proxy server 170 updates memory cache 160 by retrieving the requested web page from its target server. Alternatively, proxy server 170 records data to indicate that the requested web page was not contained in memory cache 160 or that the requested web page should be added to the memory cache 160 when the memory cache 160 is updated in the future. In either case, user 110 can be redirected to the target server to obtain the target web page.

If memory cache 160 contains a web page copy 165 corresponding to the requested URL, proxy server 170 provides user 110 the web page copy 165. In doing so, proxy server 170 provides user 110 with additional information in or with web page copy 165. For example, proxy server 170 can inform user 110 that the web page copy 165 corresponds to a stored version of the page and can inform user 110 as to the location of the current version. In an alternative embodiment, proxy server 170 informs the user 110 of the date the web page copy 165 was retrieved. Proxy server 170 can also use statistical or other information (including that described below) to indicate whether the web page copy 165 is identical or substantially similar to the current version of the target web page. In a more particular embodiment, proxy server 170 annotates web page copy 165 to provide a variety of information including: link information to other web pages relevant to the information of web page copy 165, PageRank information (as discussed in the above-referenced patent documents), broken link information, different versions (e.g., historical archive versions of the requested web page stored in memory 160, but no longer available live from the target server), different advertisements, customized advertisements, or any other information. In various respective implementations, the web page copy 165 is formatted differently, arranged according to user-selectable settings, and has information deleted from it.

In applications demanding optimal or near-optimal data-review access, proxy server 170 is further configured to render the web page copy 165 very quickly to user 110 in a manner that is time-efficient or that maximizes the user's ability to glean information from the page. In one example embodiment of this type, proxy server 170 renders first the portions of web page copy 165 that either render quickly (e.g., text) or that are deemed particularly useful to user 110. The portions that either render slowly (e.g., images) or that are deemed less useful to user 110 (e.g., advertisements) can be rendered later (if at all) by proxy server 170 either automatically or based on indications provided by user 110 (either in advance as a preference or dynamically via some action).

In another example embodiment, when rendering web page copy 165, proxy server 170 employs proprietary or public compression and rendering algorithms that are different from those employed on the target page corresponding to the web page copy 165 (e.g., wavelet-based compression for images), and proxy client 115 can be used to decompress the information compressed by proxy server 170 or render the information consistent with proxy server 170's rendering algorithms. For example, proxy server 170 can compress HTML information, which should yield a speed benefit of about three times normal. Similarly, images or advertisements can be compressed using more efficient algorithms, rendered at low resolution, or excluded altogether, either as a default or as specified by user 110. In another similar embodiment, proxy server 170 rewrites the web page copy 165 in a manner that renders more efficiently on the browser used by user 110.

In yet another related embodiment, proxy server 170 also supports chunking and keep alive between it and proxy client 115. The viewing of most pages requires many round trips (200 ms each minimum on a modem), such as one for the Domain Name Server (DNS) lookup, one for the HTML content, and another for image information. This could be reduced to one: a request containing the desired URL which is responded to everything required to render the web page corresponding to the desired URL. In a more particular implementation, the DNS lookup is performed by proxy server 170.

As yet another example embodiment, the proxy client 115 and/or the proxy server 170 modifies the settings (e.g., TCP/IP settings) on the computing device being used by user 110 so as to optimize the speed with a web page is accessed and/or rendered.

As yet another example, proxy client 115 is used to prefetch data associated with a web page that is accessed by user 110 (the "accessed web page"). This prefetched data is obtained either from a target server or from memory cache 160 by a generic approach, such as by prefetching web pages corresponding to links from the accessed web page. Alternatively, the prefetching is done using a more complex and intelligent approach. In this regard, one example approach includes proxy client 115 using statistical information (e.g., maintained by proxy client 115 itself or obtained from proxy server 170) that indicates the links on an accessed web page that are most likely to be accessed, and prefetching web pages corresponding only to those links. In various respective implementations of this type, this statistical information corresponds to user 110's past behavior, to behavior of some broader set of users, and to importance information for the potential prefetch candidates (e.g., the importance of the linked web pages, as described in U.S. Pat. No. 6,285,999, incorporated herein by reference).

According to another aspect of the present invention, if only certain portions of the target web page have changed relative to the web page copy 165 (e.g., the content of certain advertisements on the page), proxy server 170 presents user 110 with the non-changed portions from memory cache 160 and the changed portions from the target server. Even if web page copy 165 is presented to user 110, in applicable implementations, proxy server 170 (or proxy client 115) requests the target web page from the target server, thereby allowing the target web server's logs to reflect the correct number of accesses. In a slightly varied approach, proxy server 170 determines whether web page copy 165 is different from the version of that page on the target server. If this difference is determined, proxy server 170 updates memory cache 160 (either immediately or in the future) to contain the version currently on the target server. In another related approach, proxy server 170 also retrieves the version currently on the target server and presents it to user 110 (either automatically or at user 110's direction), for example in a manner such that the user 110 initially sees the web page copy 165 and then later sees the current version. In yet other variations, proxy server 170 also records data reflecting the time period over which the web page had changed (e.g., a period spanning when the web page was last stored in memory cache 160 and when proxy server 170 became aware that the web page had changed). Such data is then used for a variety of purposes including, e.g., statistical analyses. For example, such data can be used to determine how often each web page changes, to determine the top X most frequently changing web pages, etc.

If proxy server 170 or proxy client 115 determines that web page copy 165 is different from the version of that page on the target server, although not a requirement for all applications, a particular implementation does not present web page copy 165 to user 110 at all, but rather presents only the version of the page from the target server. This approach is useful, for example, in applications in which changing a version of the page would disrupt the user 110 during a live review. Which page is presented to user 110 in such a scenario could be addressed via a default option, with user 110 having the ability to modify that default option.

According to a further implementation consistent with the present invention, proxy server 170 is configured to facilitate the ability of web page servers (e.g., server 120) to transmit web pages (e.g., web page 125) or other information to proxy server 170. Web page servers transmit web pages to proxy server 170 so that proxy server 170 handles requests for the web pages from user 110, rather than the web page servers themselves having to service such requests. In alternative implementations, web page servers transmit information notifying proxy server 170 when certain web pages on those web page servers change in content. In one such embodiment, web page servers assign tags to web pages, such as ProxyServeThis, DoNotProxyThis, ProxyLogAccessDirectly, ProxyArchiveThisForever, and ProxyWillNotifyYouOn-UpdateOfThisPage, etc., to facilitate such information or web page exchange. Even if the web page servers do not transmit information regarding web pages to proxy server 170, in some implementations such tags are used to regulate the activities of the proxy server 170, such as web server operators using the DoNot ProxyThis tag to prevent certain pages (such as frequently modified pages) from being included in memory cache 160.

In yet other applications and implementations, the approach of using a proxy server and/or client is implemented in a manner that is transparent to user 110, with the exception of a speed increase in having the web page fetch request fulfilled. In one such embodiment, the start of a fetch from the proxy server is less than 100 milliseconds for broadband-connected users and less than 300 milliseconds for modem-connected users. In both cases, web page retrieval proceeds at the maximum bandwidth of the respective connection in most instances.

In other embodiments that are also consistent with the present invention, the above-discussed proxy server or the proxy client software applications 115 establishes or accesses a list of target web pages for which presenting a web page copy 165 is not desirable. This "exclusion" list includes target web pages for which such an approach would provide little if any advantage, such as web sites that are typically updated regularly (e.g., daily or weekly) and/or are sought by users largely or solely to obtain the updated information. Among a list of possible sites of this type, examples include email and news web sites such as daily events, weather and stock prices. As may be beneficial for particular applications, the "exclusion" list is explicitly specified by user 110, explicitly specified by proxy server 170, implicitly determined based on historical actions of user 110 (e.g., if user 110 has sought direct access to the target web page more than a specified percentage of times), determined by proxy server 170 as a function of the actions of a set of users, as well as in any of a variety of other ways discernible from the above discussion.

Also consistent with the present invention, variations of the above-described embodiments include implementations that generate revenue. In one such implementation, advertisements are included with the web-page copy 165. These advertisements are, for example, general or selected by the proxy server 170 from a database of advertisements specifically in response to the target web page query. In another implementation of this type, the targeted electronic document (or web page) is provided for a fee that is fixed at a single price or tiered at prices which are selected according to various value-based criteria. In one example, such a tiered fee includes a negligible (or free) level for minimal use and a higher level for more significant use wherein the proxy server 170 maintains a log of access by users 110 and rejects access once a user 110 attempts to access the data library more than a threshold number of times in a given period (e.g., a month or year). In another implementation, the tiered fee includes a lower fee for general and/or minimal use, and a higher fee for a more selective service that includes unlimited access to the information contain in memory cache 160, more information (as discussed above) relevant for the user 110 determining whether to hyperlink to the actual target web page, and/or exclusion of information on the web page that is not relevant to the user query (e.g., advertisements and nonrelevant substantive data included in the web page copy). In yet another embodiment, the invention's service is provided to Internet Service Providers (ISPs) for a fee. The ISPs, in turn, charge end users according to one or more of the above-described approaches.

Other important advantages realized by various embodiments of the present invention are directed to significantly decreasing traffic congestion. With the proxy server farm maintaining web page copies based on the frequency of user queries for access to the actual target web pages, the above-discussed access to the proxy server farm offsets congestion at web page host server, which relates directly to decreasing latency in providing a response to the user query. This advantage is enhanced by including a cache coordinated at the proxy server farm for frequently-requested web pages. This cache can be part of the proxy server farm or coupled to the proxy server farm, e.g., using a high-speed communication channel.

Other congestion-advantaged implementations use a proxy client software application installed at certain ISPs or other nodes internal to the data network (or Internet). These proxy client software applications can be installed in lieu of or in addition to the proxy client software application installed in the user computers. In these implementations, a user query for a particular target page is redirected to the above-discussed fast-access proxy server.

The present invention should not be construed as being necessarily limited to the particular examples described above but, rather, should be limited by the appended claims and construed to be consistent with one or more of the exemplary embodiments. For instance, while hyperlinked documents (e.g., web pages) are illustrated, other types of electronic documents may be used consistent with the present invention. Various modifications, equivalent processes, as well as numerous structures to which the present invention may be applicable will be readily apparent to those of skill in the art to which the present invention is directed upon review of the present specification. The claims are intended to cover such modifications and devices.

I claim:

1. A computer-implemented method of serving electronic document information in response to a user query identifying a target electronic document, comprising:
   in response to the user query received from a client device, searching a library of proxy-stored electronic documents located at a proxy server to determine whether the target electronic document corresponds to a proxy-stored electronic document; and
   in response to the target electronic document corresponding to the proxy-stored electronic document,
      transmitting the proxy-stored electronic document from the proxy server to the client device for presentation to the user,
      transmitting with the proxy-stored electronic document information indicating a relationship between the proxy-stored electronic document and the target electronic document, wherein the target electronic document is stored on a host computer distinct from the proxy server and distinct from the client device, and
      transmitting, along with and in addition to the proxy-stored document, an indication of the importance of the target document.

2. The computer-implemented method of claim 1, wherein the information includes the date on which the proxy-stored document was added to the library.

3. The computer-implemented method of claim 1, further including transmitting a link to the target document with the proxy-stored electronic document.

4. The computer-implemented method of claim 1, wherein the information includes an indication of whether the proxy-stored document differs from the target document.

5. The computer-implemented method of claim 1, wherein the information indicates whether a link to the target document still exists.

6. The computer-implemented method of claim 1, further comprising requesting the target document.

7. The computer-implemented method of claim 1, further comprising receiving into the library a copy of a target document that is transmitted by an owner-designated agent of the target document.

8. The computer-implemented method of claim 1, further comprising: in response to the target document not corresponding to said at least one of the proxy-stored documents, taking an action.

9. The computer-implemented method of claim 8, wherein the action comprises redirecting the user to the target document.

10. The computer-implemented method of claim 8, wherein the action comprises updating the library of proxy-stored documents to include a copy of the target document.

11. The computer-implemented method of claim 8, wherein the action comprises recording data to indicate that the target document was not contained in the library of proxy-stored documents.

12. The computer-implemented method of claim 1, including encoding at least a portion of the proxy-stored document prior to the transmitting of the proxy-stored document from the proxy server to the client device so as to reduce rendering time of the proxy-stored document at the client device.

13. The computer-implemented method of claim 12, wherein the encoding comprises compressing the proxy-stored document in a manner different from that used in the target document.

14. The computer-implemented method of claim 12, wherein the encoding comprises encoding the proxy-stored document in a manner dependent on the means being employed by the user to view documents.

15. The computer-implemented method of claim 12, wherein the portion comprises text information.

16. The computer-implemented method of claim 12, wherein the portion comprises image information.

17. The computer-implemented method of claim 12, wherein the portion comprises advertisement information.

18. The computer-implemented method of claim 12, wherein the encoding comprises excluding an excludable portion of the proxy-stored document that renders slowly.

19. The computer-implemented method of claim 18, wherein the excludable portion comprises image information.

20. The computer-implemented method of claim 18, wherein the excludable portion comprises advertisement information.

21. A computer-implemented method of serving electronic document information in response to a user query identifying a target electronic document, comprising:
   in response to the user query received from a client device, searching a library of proxy-stored electronic documents located at a proxy server to determine whether the target electronic document corresponds to a proxy-stored electronic document; and
   in response to the target electronic document corresponding to the proxy-stored electronic document,
      transmitting the proxy-stored electronic document from the proxy server to the client device for presentation to the user,
      transmitting, along with and in addition to the proxy-stored electronic document, information indicating a relationship between the proxy-stored electronic document and the target electronic document, wherein the target electronic document is stored on a host computer distinct from the proxy server and distinct from the client device, and
      prefetching additional documents likely to be desired by the user, wherein the prefetching is performed by the proxy server, wherein the prefetching is based on references contained in the proxy-stored document and importance information associated with the references contained in the proxy-stored document.

22. The computer-implemented method of claim 21, wherein the prefetching is further based on references contained in the target document.

23. The computer-implemented method of claim 21, wherein the prefetching is further based on historical information collected from the user.

24. The computer-implemented method of claim 21, wherein the prefetching is further based on historical information collected from a set of users.

25. A proxy server for serving electronic document information in response to a user query identifying a target electronic document, comprising:
   means, responsive to the user query received from a client device, for searching a library of proxy-stored electronic documents at the proxy server to determine whether the target electronic document corresponds to a proxy-stored electronic document; and
   means, responsive to the target electronic document corresponding to the proxy-stored electronic document,
      for transmitting the proxy-stored electronic document from the proxy server to the client device for presentation to the user,
      for transmitting with the proxy-stored electronic document information indicating a relationship between the proxy-stored electronic document and the target electronic document, wherein the target electronic document is stored on a host computer distinct from the proxy server and distinct from the client device,
      and for transmitting, along with and in addition to the proxy-stored document, an indication of the importance of the target document.

26. A proxy server for serving electronic document information in response to a user query identifying a target electronic document, comprising:
   means, responsive to the user query received from a client device, for searching a library of proxy-stored electronic documents at the proxy server to determine whether the target electronic document corresponds to a proxy-stored electronic document;
   means, responsive to the target electronic document corresponding to the proxy-stored electronic document, for transmitting the proxy-stored electronic document from the proxy server to the client device for presentation to the user, and for transmitting, along with and in addition to the proxy-stored electronic document, information indicating a relationship between the proxy-stored electronic document and the target electronic document, wherein the target electronic document is stored on a host computer distinct from the proxy server and distinct from the client device, and
   means for prefetching additional documents likely to be desired by the user wherein the prefetching is based on references contained in the proxy-stored document and importance information associated with the references contained in the proxy-stored document.

* * * * *